United States Patent [19]
Muraki et al.

[11] Patent Number: 6,033,333
[45] Date of Patent: Mar. 7, 2000

[54] ECCENTRIC ORBITING TYPE PLANETARY GEAR DEVICE

[75] Inventors: Shigehisa Muraki; Jun Hirose, both of Mie; Shotaro Kodaka, Tochigi, all of Japan

[73] Assignee: Teijin Seiki Co., Ltd., Osaka, Japan

[21] Appl. No.: 08/976,328

[22] Filed: Nov. 21, 1997

Related U.S. Application Data

[62] Division of application No. 08/667,130, Jun. 20, 1996, Pat. No. 5,772,494.

[30] Foreign Application Priority Data

Jul. 3, 1995 [JP] Japan .................................... 7-191085

[51] Int. Cl.[7] ...................................................... F16H 1/32
[52] U.S. Cl. ................................................................ 475/178
[58] Field of Search ...................... 475/162, 168, 475/178

[56] References Cited

U.S. PATENT DOCUMENTS

| | | | |
|---|---|---|---|
| 4,407,170 | 10/1983 | Fukui | 475/162 X |
| 4,594,915 | 6/1986 | Braren | 475/178 X |
| 4,730,946 | 3/1988 | Cain . | |
| 4,846,018 | 7/1989 | Matsumoto et al. | 475/162 X |
| 5,322,485 | 6/1994 | Haga | 475/162 X |
| 5,484,345 | 1/1996 | Fukaya | 475/178 X |

FOREIGN PATENT DOCUMENTS

| | | | |
|---|---|---|---|
| 0655657 | 1/1963 | Canada . | |
| 1 340 232 | 9/1963 | France . | |
| 55-112450 | 8/1980 | Japan . | |
| 03041240 | 2/1991 | Japan . | |
| 3-41240 | 2/1991 | Japan | 475/178 |
| 3-239842 | 10/1991 | Japan | 475/162 |

*Primary Examiner*—Sherry L. Estremsky
*Attorney, Agent, or Firm*—Akin, Gump, Strauss, Hauer & Feld, L.L.P.

[57] ABSTRACT

An eccentric orbiting type planetary gear device includes a bearing which requires no pre-load adjustment. The planetary gear device is small in the number of components when compared with the conventional device, and is improved in performance and in assembling efficiency. In manufacturing an eccentric orbiting type planetary gear device in which a supporting block (31) is made up of a supporting member (32) having a plurality of pillar-like portions (32*a*), and a disk (33), the supporting member and the disk being fastened to each other with fastening members (35) with an external gear (21) between the supporting member and the disk in such a manner the external gear is engaged with an internal gear; the supporting member and the disk are abutted against each other through end faces thereof, and are fastened to each other to form the supporting block, and bearing rolling surfaces (32*b*) and (33*a*) corresponding to inner races are formed in the supporting member and the disk at a predetermined interval.

5 Claims, 14 Drawing Sheets

ECCENTRIC ORBITING TYPE PLANETARY GEAR DEVICE

CROSS-REFERENCE TO RELATED APPLICATION

This is a division of application Ser. No. 08/667,130, filed Jun. 20, 1996, now U.S. Pat. No. 5,772,494.

BACKGROUND OF THE INVENTION

1. Field of the Invention

This invention relates to an eccentric orbiting type planetary gear device, and a method of manufacturing the device, and more particularly to an eccentric orbiting type planetary gear device in combination with bearings, and a method of manufacturing the device.

2. Description of the Related Art Japanese Patent Application (OPI) No. 41240/1991 has disclosed the following eccentric orbiting type planetary gear device: That is, a supporting member and a disk, which form a supporting block, are machined in advance and separately so that they have rolling surfaces corresponding to inner races. The supporting member and the disk thus machined are joined together by tightening bolts with an external gear interposed in the supporting member and the disk. The amount of movement of the supporting member and the disk which is due to the tightening force is utilized to apply a predetermined pre-load to bearings interposed between the supporting block and an internal gear member.

As was described above, in the conventional eccentric orbiting type planetary gear device in which the external gear is interposed between the supporting member and the disk, the supporting member and the disk are machined individually, and then assembled. Each of those components has its own machining error. Hence, when the components are assembled, the errors are added, providing a relatively large error value in total. Hence, it is essential to control the pre-load applied to the bearings inserted between the supporting block and the body.

A variety of pre-load control methods are known in the art. In one of the methods, a distance between bearings is measured, or a gap in an axial direction is measured. In another method, as was described with reference to Japanese Patent Application (OPI) No. 41240/1991, the pre-load is applied by tightening the bolts. In another method, a distance piece is set between each pair of bearings, or as shown in FIG. 16 a distance piece is set at the end of the bearing, thereby to adjust the gap between bearings in the axial direction.

If this pre-load adjustment is unsatisfactory, then rotational torque variation occurs, which may results in lost motion when the direction of rotation is reversed, or may give rise to a problem that rigidity against bending moment is lowered. Hence, if this eccentric orbiting type planetary gear device is employed for a positioning device, the positioning accuracy is unavoidably unsatisfactory.

Furthermore, the above-described conventional eccentric orbiting type planetary gear device is disadvantageous in that it is made up of a large number of components. Especially, in the case of the device using the distance pieces, it is necessary to prepare several kinds of distance pieces different in width. On the other hand, a method may be employed in which bearings high in accuracy are used to reduce the amount of adjustment. However, the method involves another problem that, since a bearing comprises an inner race, an outer race, rolling elements such as rollers, and a holder, the employment of a bearing high in accuracy will increase the manufacturing cost according to the degree of accuracy of the bearing.

Moreover, in the conventional eccentric orbiting type planetary gear device, the gap between the bearing and the bearing inserting section as viewed in the radial direction affects the lost motion of the device. In addition, the gap is not uniform in radial directions. This fact results in variations in the performance (the rigidity against bending moment), thus adversely affecting the performance of the device.

Heretofore, in order to reduce the radial gap, the bearing including the inner and outer races is press-fitted in the bearing inserting section. To do so, a great force is required; that is, it is necessary to use a press-fitting device. On the other hand, it takes time and labor to join the bearing and the bearing inserting section, which results in an increase in manufacturing cost. In addition, the pre-load adjustment is necessary during assembling. That is, the conventional eccentric orbiting type planetary gear device is low in assembling efficiency.

SUMMARY OF THE INVENTION

An object of the invention is to provide an eccentric orbiting type planetary gear device which requires no pre-load adjustment, and small in the number of components when compared with the conventional device, and is improved in performance and in assembling efficiency, and a method of manufacturing the device.

In order to achieve the foregoing object, a method of manufacturing an eccentric orbiting type planetary gear device in which a supporting block comprises a supporting member having a plurality of pillar-like portions, and a disk, the supporting member and the disk being fastened to each other with a fastening member with an external gear set between the supporting member and the disk in such a manner the external gear is engaged with an internal gear, has been proposed, in which, according to the invention,
the supporting member and the disk are abutted against each other through end faces thereof, and are fastened to each other to form the supporting block, and bearing rolling surfaces corresponding to inner races are formed in the supporting member and the disk at a predetermined interval, respectively.

In addition, an eccentric orbiting type planetary gear device is proposed which comprises an internal gear, an external gear, a cam shaft, and a supporting block including a supporting member having a plurality of pillar-like portions, and a disk, the supporting member and the disk being positioned with a positioning member and fastened to each other with a fastening member with the external gear set between the supporting member and the disk, in which, according to the invention,
with the supporting member and disk of the supporting block positioned with the positioning member and fastened to each other with the fastening member, bearing rolling surfaces corresponding to inner races are formed in the supporting member and the disk at predetermined interval.

DETAILED DESCRIPTION OF THE PREFERRED EMBODIMENTS

The invention will be described with reference to the accompanying drawings in detail.

Figure 1:
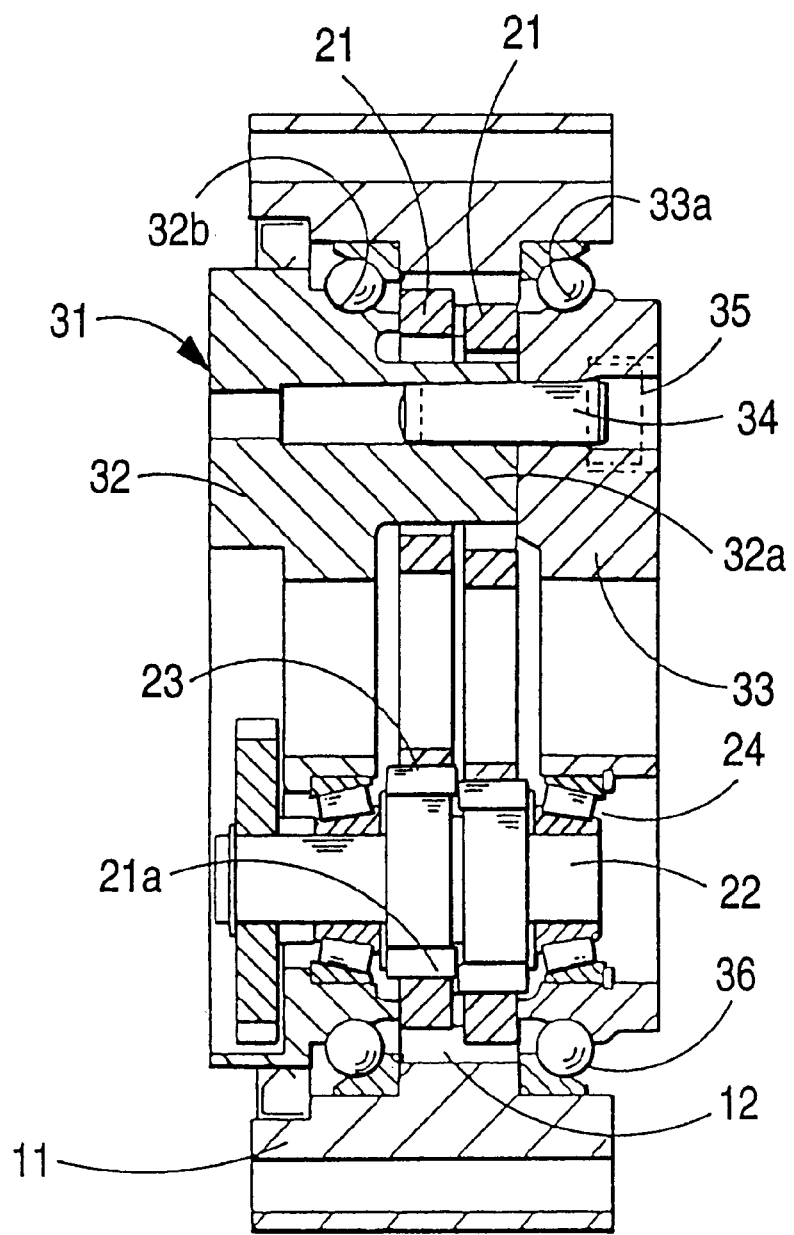
FIG. 1 is a sectional view of an example of an eccentric orbiting type planetary gear device, which constitutes a first embodiment of the invention.
Figure 2:
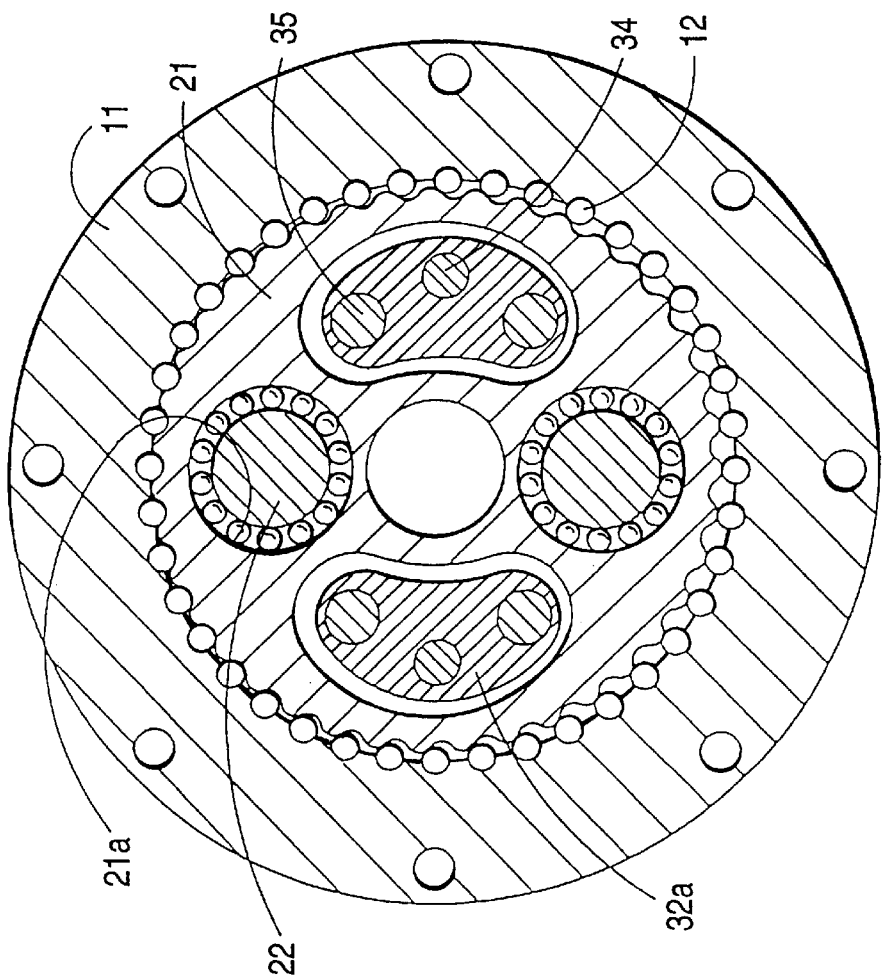
FIG. 2 is a vertical sectional view of the first embodiment shown in FIG. 1.
Figure 3:
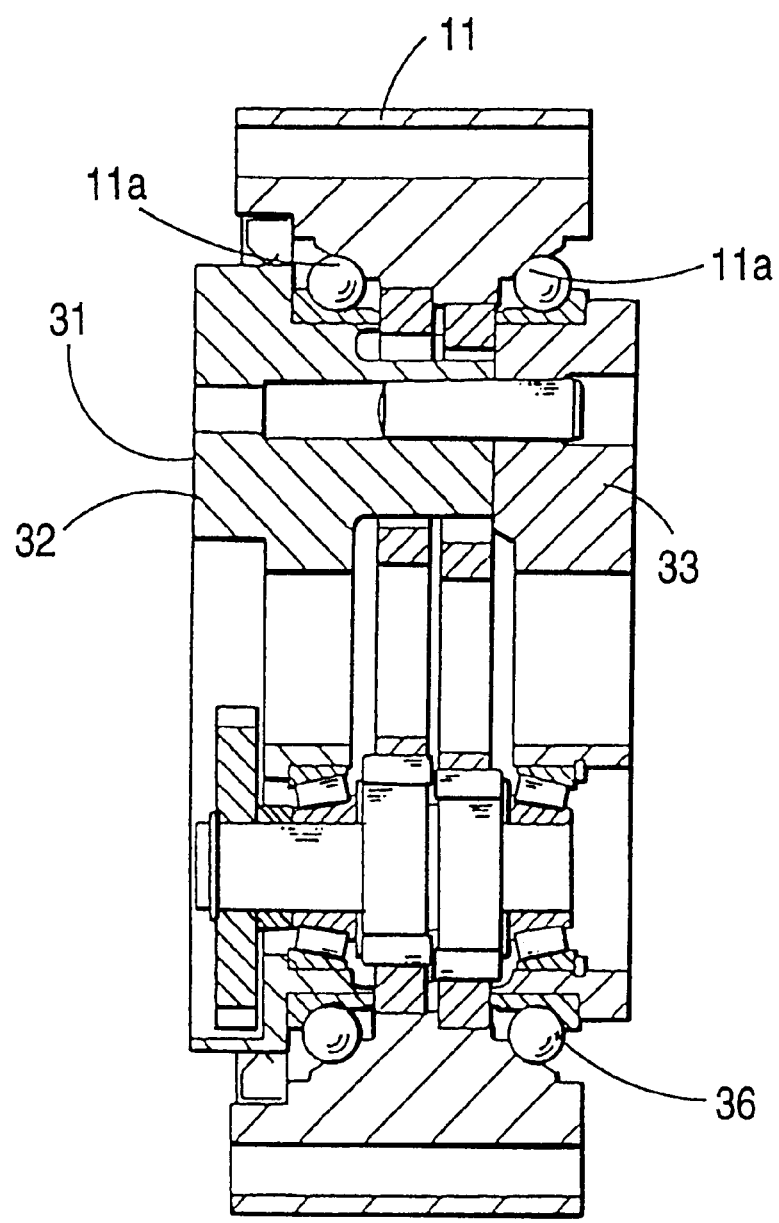
FIG. 3 is a sectional view of another example of the device, which constitutes a second embodiment of the invention.

FIGS. 1 and 2 show an example of an eccentric orbiting type planet gear device, which constitutes a first embodiment of the invention, in which bearing rolling surfaces corresponding to inner races are formed at predetermined intervals.

The eccentric orbiting type planet gear device, as shown in FIGS. 1 and 2, comprises: an internal gear 11 which is a pin gear having pins 12 on its internal cylindrical surface; an external gear 21 which is engaged with the internal gear 11; cam shafts 22 which are fitted through needle bearings 23 in cam inserting holes 21a so that the external gear 21 is turned while making an orbiting motion; and a supporting block which supports both ends of each of the cam shafts 22 through taper roller bearings 24.

The supporting block 31 comprises: a supporting member 32 having a plurality of protruded pillar-like portions 32a, and a disk 33. The supporting member 32 and the disk 33 are positioned with positioning members 34, and are fastened to each other with fastening members 35.

Figure 6:
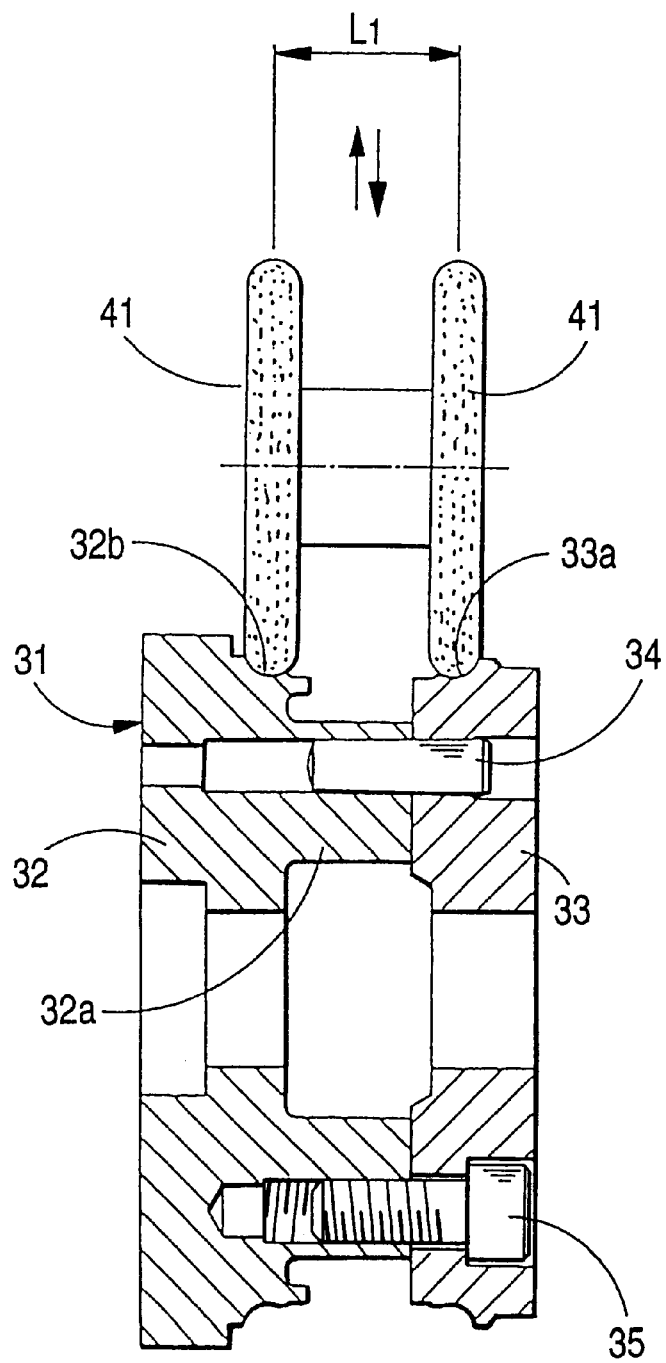
FIG. 6 is a sectional view showing a method of forming rolling surfaces in a supporting block.
Figure 7:
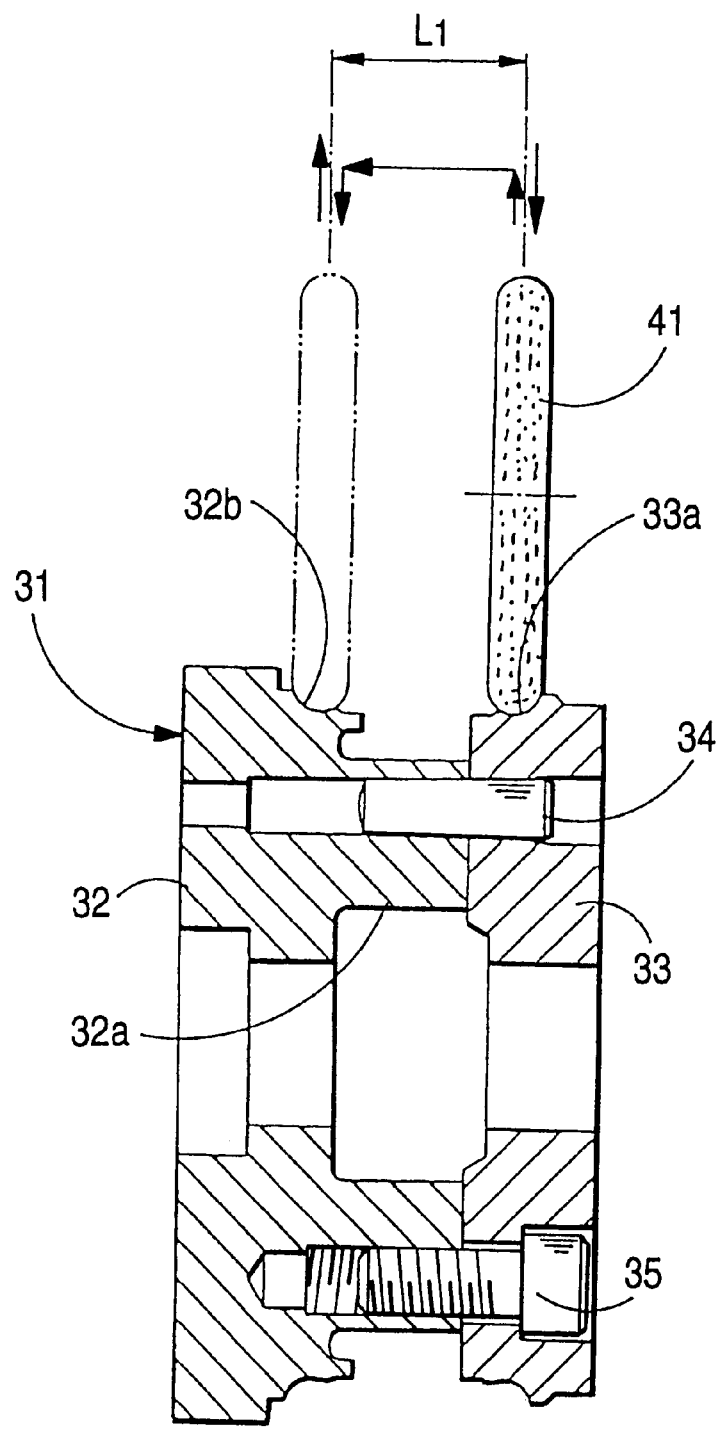
FIG. 7 is a sectional view showing another method of forming rolling surfaces in the supporting block.

The supporting member 32 and the disk 33 of the supporting block 31 have rolling surfaces 32b and 33a, respectively, which correspond to bearing inner races for the bearing rolling elements 36. The bearing rolling surfaces 32b and 33a are formed as follows: As shown in FIGS. 6 and 7, the supporting member 32 and the disk 33 are set abutted against each other through their end faces, and then positioned by means of the positioning members 34, and thereafter fastened to each other with the fastening members, to obtain the supporting block 31. The supporting member 32 and the disk 33 of the supporting block thus obtained are machined at predetermined intervals for instance with a grinding attachment, to obtain the bearing rolling surfaces.

After the bearing rolling surfaces 32b and 33a have been formed in the supporting member 32 and the disk 33 in the above-described manner, the fastening members 35 are loosened, and the positioning members 34 are removed from the supporting member 32 and the disk 33, to separate those components 32 and 33 from each other. Under this condition, the internal gear 11, the external gear 21, and the cam shafts 22 are combined together, and the supporting member 32 and the disk 33 are abutted against each other through their end faces. Under this condition, the supporting member 32 and the disk 33 are positioned relative to each other with the positioning members 34, and fastened to each other with the fastening members 35. Thus, the eccentric orbiting type planet gear device has been assembled.

The positioning members 34 are for instance, tapered pins, and are to position the supporting member 32 and the disk 33 which have been separated from each other.

The fastening members 35 are, for instance, hexagonal socket head cap bolts. The supporting member 32 and the disk 33 are fixedly fastened to each other with a predetermined fastening force.

An example of a method of forming the bearing rolling surfaces 32a and 33a in the supporting member 32 and the disk 33 at predetermined intervals is as shown in FIG. 6. A pair of grinding stones 41 and 41 whose peripheral ends are shaped as required are mounted on the tool mounting shaft of a grinding attachment in such a manner that the grinding stones are spaced as much as $L_1$ from each other. The tool mounting shaft together with the grinding stones 41 and 41 is moved to and from the supporting member 32 and the disk 33, to form the bearing rolling surfaces 32a and 33a.

Another example of the method is as shown in FIG. 7. One grinding stone is mounted on the tool mounting shaft of the grinding attachment. For instance, first the grinding stone 41 is moved to the disk 33, to form the bearing rolling surfaces 33a, and the grinding stone 41 is moved away from the disk 33, and thereafter it is shifted as much as the predetermined distance $L_1$ to the side of the supporting member 32. Under this condition, the grinding stone 41 is moved to the supporting member 32, to form the bearing rolling surfaces 32a. Thereafter, the grinding stone 41 is moved away from the supporting member 32.

In the above-described embodiment, the internal gear is made up of a number of cylindrical pins. However, the internal gear may be replaced with a gear means having pin-shaped gear. In this case, bearing rolling surfaces 11a corresponding to the outer races are formed in the internal gear. This is a second embodiment of the invention.

In the second embodiment, similarly as in the above-described first embodiment, the inner races or the outer races of the bearings are formed in the gear. Hence, the assembling errors are half of those in the prior art, or less.

Figure 4:
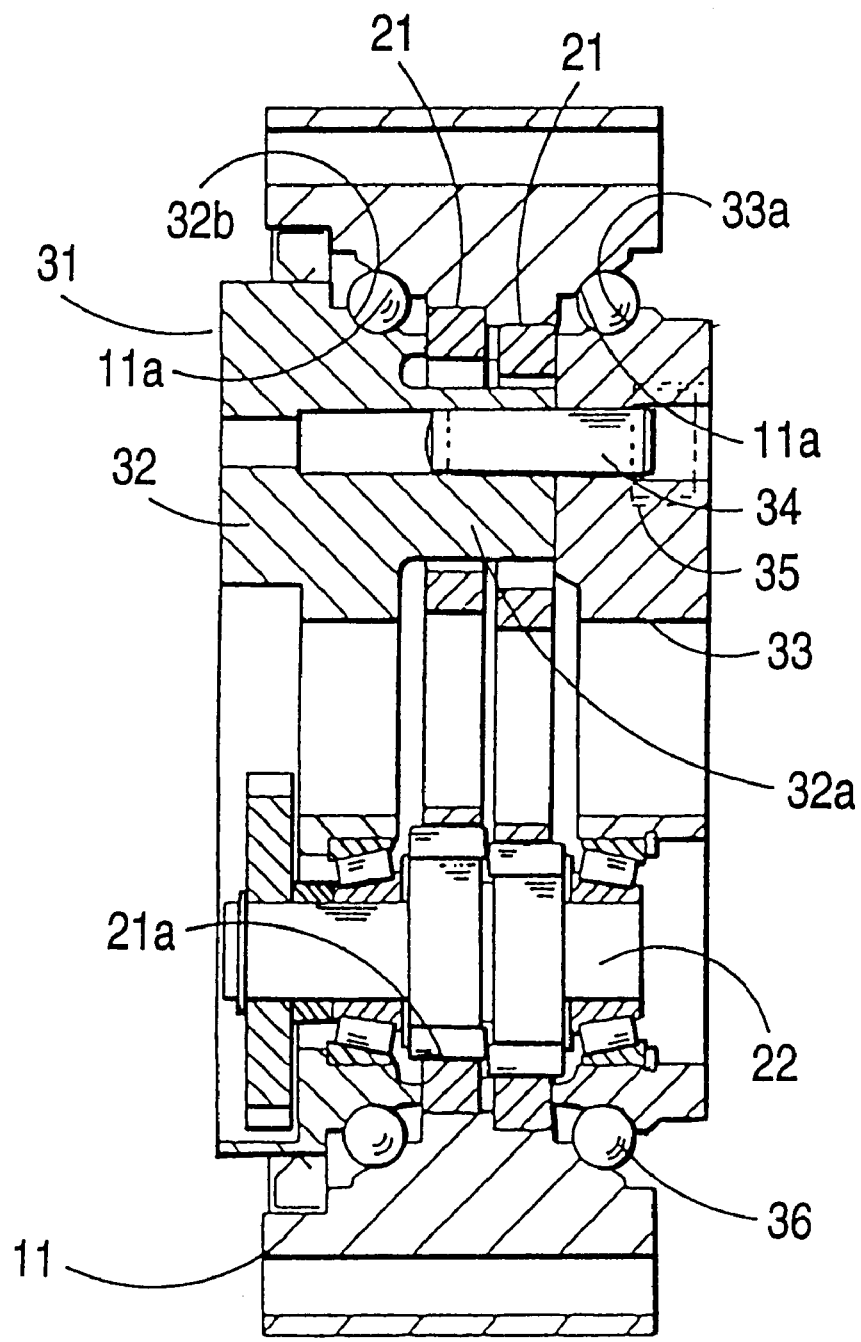
FIG. 4 is a sectional view showing another example of the device, which constitutes a third embodiment of the invention.
Figure 5:
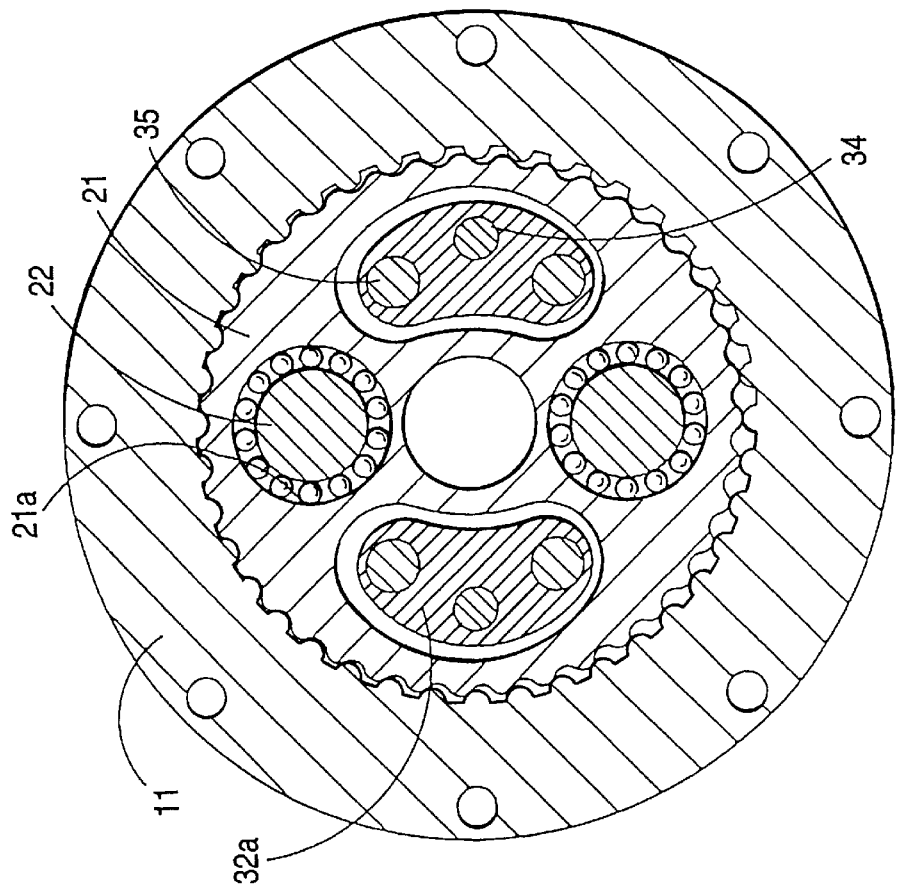
FIG. 5 is a vertical sectional view of the device shown in FIG. 4.

FIGS. 4 and 5 show a third embodiment of the invention. In the third embodiment, a supporting block has bearing rolling surfaces corresponding to inner races at predetermined intervals, and an internal gear having pin-like protrusions at predetermined intervals has bearing rolling surfaces 11a corresponding to outer races at predetermined intervals.

Figure 8:
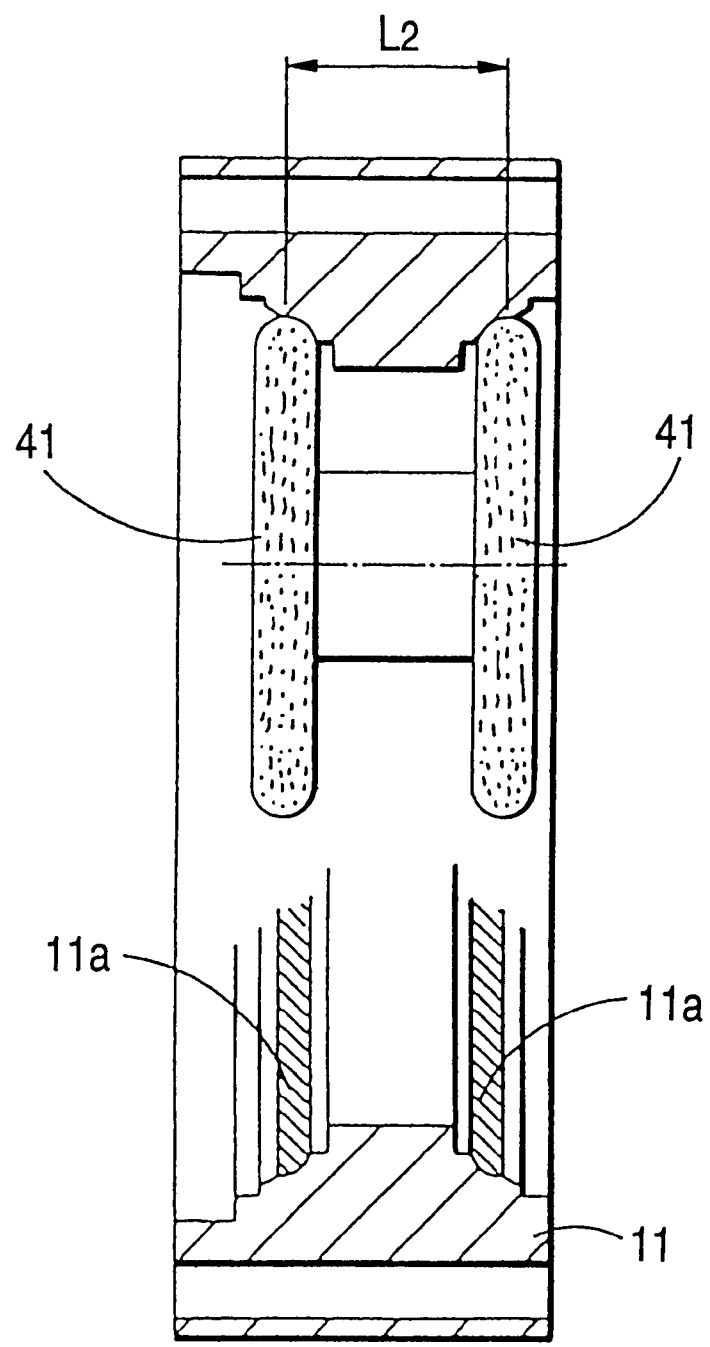
FIG. 8 is a sectional view showing a method of forming angular ball bearing outer race grooves in the internal gear.

One example of a method of forming the bearing rolling surfaces 11a in the internal gear 11 at predetermined intervals is as follows: As shown in FIG. 8, a pair of grinding stones 41 and 41 are spaced a predetermined distance $L_2$, and mounted on the tool mounting shaft of the grinding attachment. Under this condition, the tool mounting shaft together with the grinding stones 41 and 41 is moved to and from the internal gear 11 to form the bearing rolling surfaces 11a.

Figure 9:
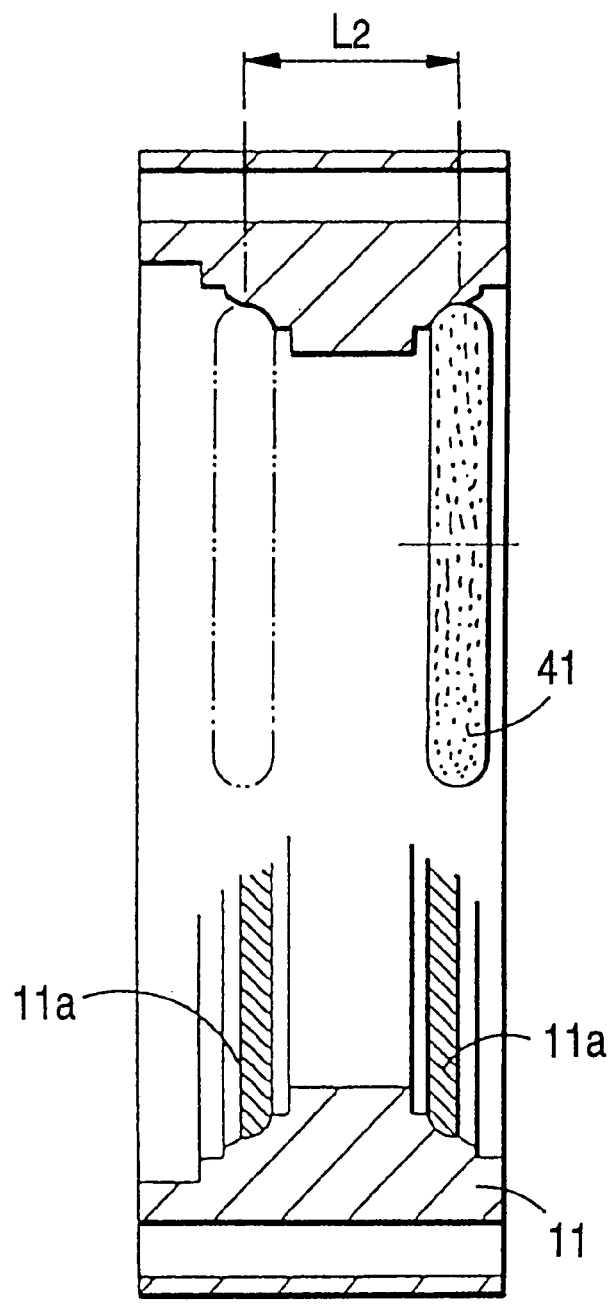
FIG. 9 is a sectional view showing another method of forming angular ball bearing outer race grooves in the internal gear.

Another example of the method is as shown in FIG. 9. One grinding stone 41 is mounted on the tool mounting shaft of the grinding attachment. First, the grinding stone 41 is moved, for instance, to one side of the internal gear 11, to form the bearing rolling surfaces 11a on the side, and the grinding stone 41 is moved away from the internal gear 11, and thereafter it is shifted as much as the predetermined distance $L_2$ to the other side of the interval gear 11. Under this condition, the grinding stone 41 is moved to the internal gear 11 to form the bearing rolling surfaces 11a on the other side. Thereafter, the grinding stone 41 is moved away from the internal gear 11.

Figure 10:
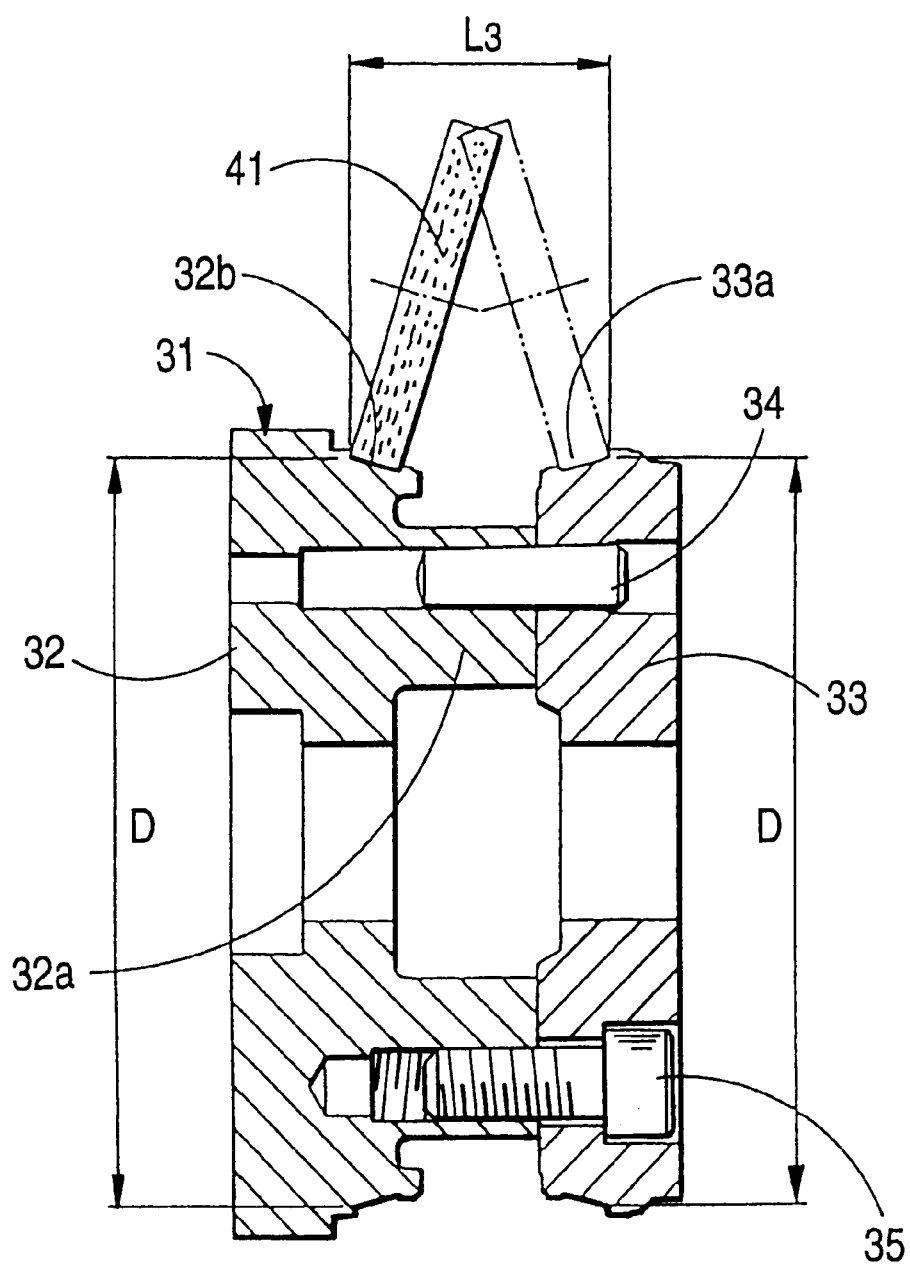
FIG. 10 is a sectional view showing a method of forming taper roller bearing inner races in the supporting block.
Figure 11:
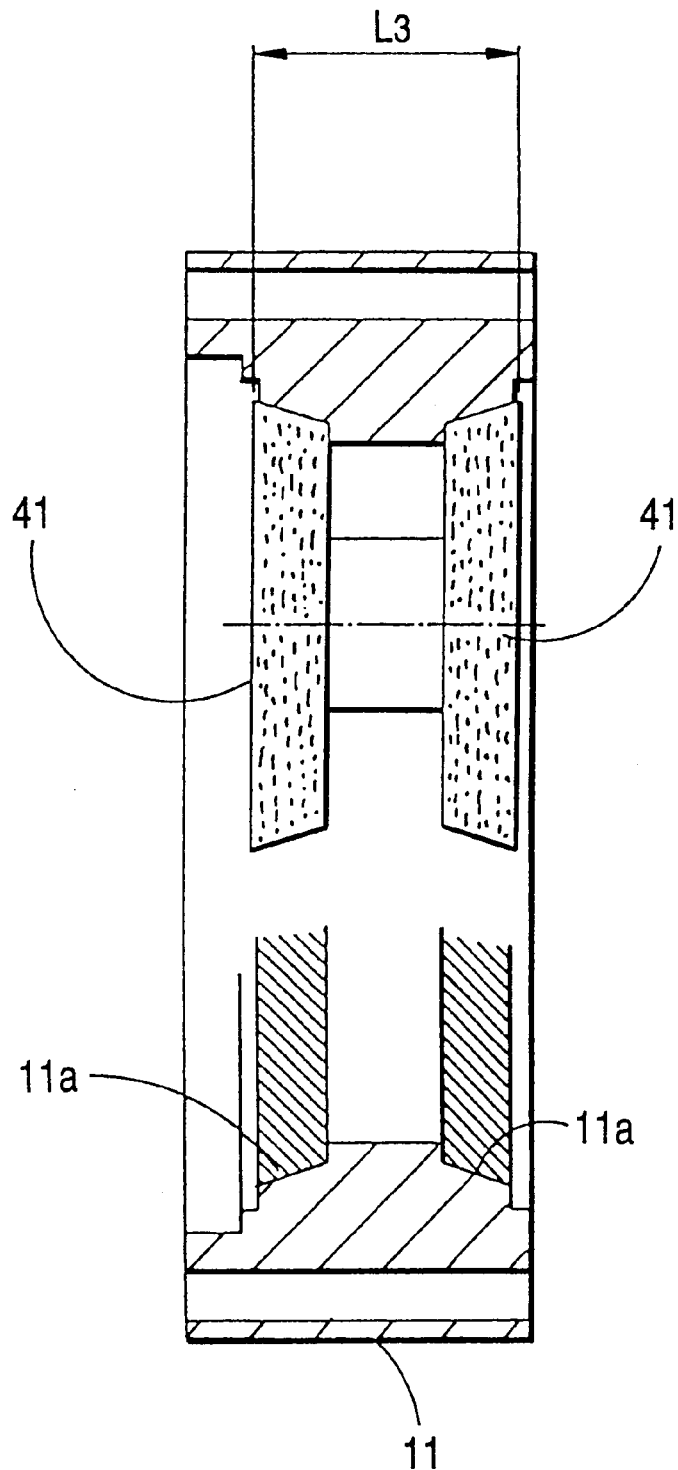
FIG. 11 is a sectional view showing another method of forming taper roller bearing inner races in the supporting block.

As shown in FIGS. 10 and 11, the bearing rolling surfaces may be tapered roller bearing grooves. However, it should be noted that sometimes, as shown in FIG. 10, machining the tapered roller bearing grooves as inner races may be intricate depending on the amount of movement $L_3$ of the grinding tool, the diameter D of the supporting block, and the adjustment of the grinding tool.

On the other hand, the bearing rolling surfaces may be angular ball bearing grooves. In this case, as shown in FIGS. 7 and 9, the number of diamond wheels to be used may be only one; that is, the grinding tool may be simple as much, and the resultant grooves are completely equal in configuration to one another. In this connection, the amounts of shift $L_1$ and $L_2$, the amount of feeding the grinding stone in the radial direction, can be accurately controlled by NC control.

The above-described dimensions $L_1$, $L_2$ and $L_3$ are so set that the pre-load applied to the bearings is most suitable, and contributes to the formation of the bearing rolling surfaces in the supporting member 32 and the disk 33 which are abutted against each other through their end faces, and are fixedly fastened to each other with a predetermined fastening force. In assembling the planetary gear device, the supporting member 32 and the disk 33 are separated from each other, and the bearing rolling elements and the external gear are combined with the supporting member 32 and the disk 33. Under this condition, the supporting member 32 and the disk 33 are fastened together. In this operation, it is preferable to use a torque wrench, because the use of the torque wrench makes it possible to reassemble the supporting block with the fastening force which is equal to that which is used in forming the bearing rolling surface. In the case where, as was described above, the supporting block is reassembled with the fastening force which is equal to that which is used in forming the bearing rolling surfaces, then the difficulty is eliminated that the planetary gear device is lowered in precision by the reassembling work.

Figure 12:
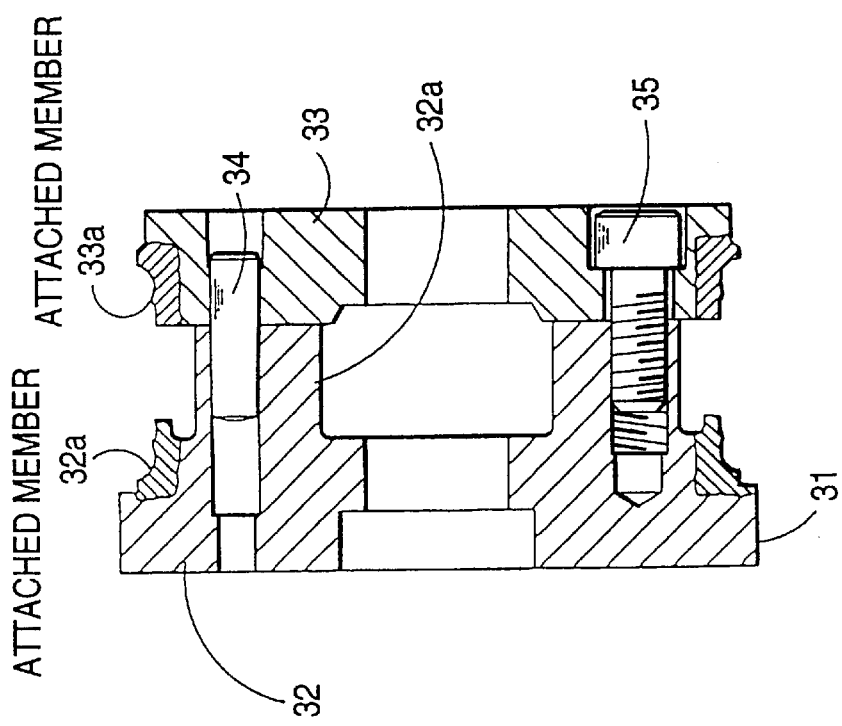
FIG. 12 is a sectional view of another example of the device, which constitutes a fourth embodiment of the invention.

In forming the bearing rolling surfaces corresponding to inner races in the supporting member 32 and the disk 33 of the supporting block 31, the following method may be employed: The supporting member 32 and the disk are made of bearing steel SUJ or carbon steel S55C, and the parts of the supporting member and the disk which are to be formed into the bearing rolling surfaces are hardened by heat treatment such as induction hardening, and thereafter ground, as shown in FIG. 12.

Figure 13:
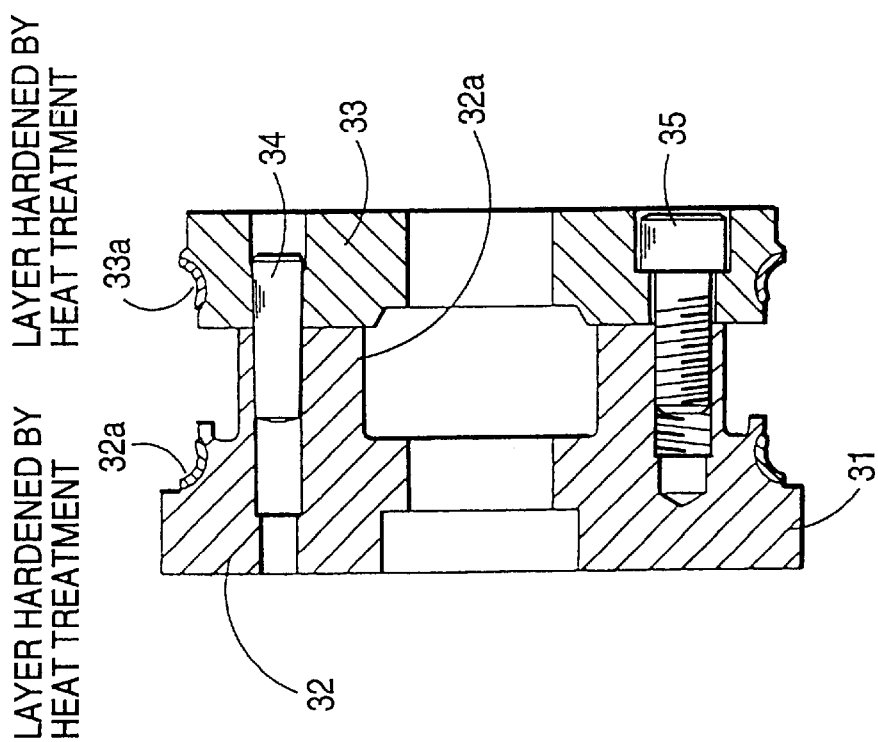
FIG. 13 is a sectional view of another example of the device, which constitutes a fifth embodiment of the invention.

Another method is as shown in FIG. 13. The supporting member 32 and the disk 33 are formed by using nodular graphite cast-iron. Different kinds of members such as bearing steel SUJ and carbon steel S55C are welded to the bearing rolling surfaces corresponding to inner races, and the members thus welded are subjected to heat treatment so as to become suitable as rolling surfaces.

Figure 14:
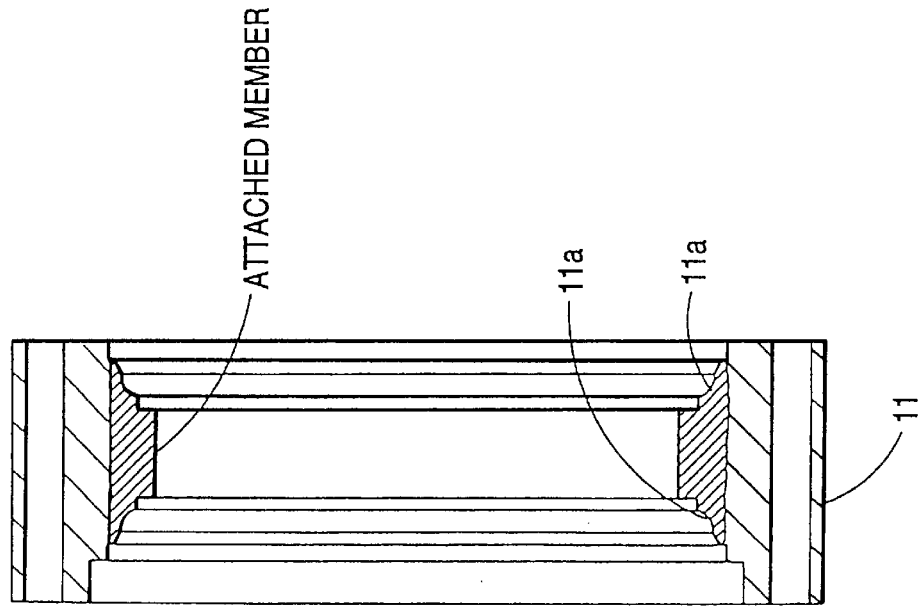
FIG. 14 is a sectional view of another example of the device, which constitutes a sixth embodiment of the invention.
Figure 15:
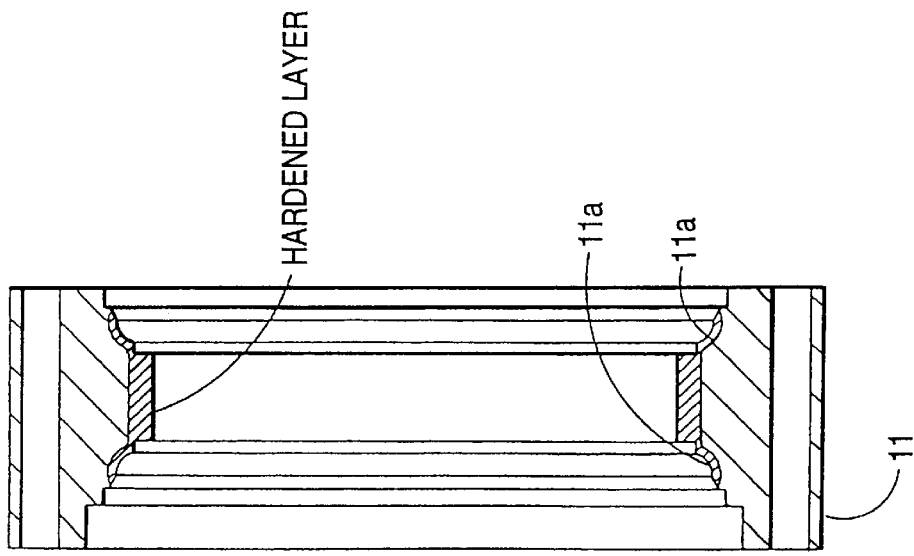
FIG. 15 is a sectional view of another example of the device, which constitutes a seventh embodiment of the invention.
Figure 16:
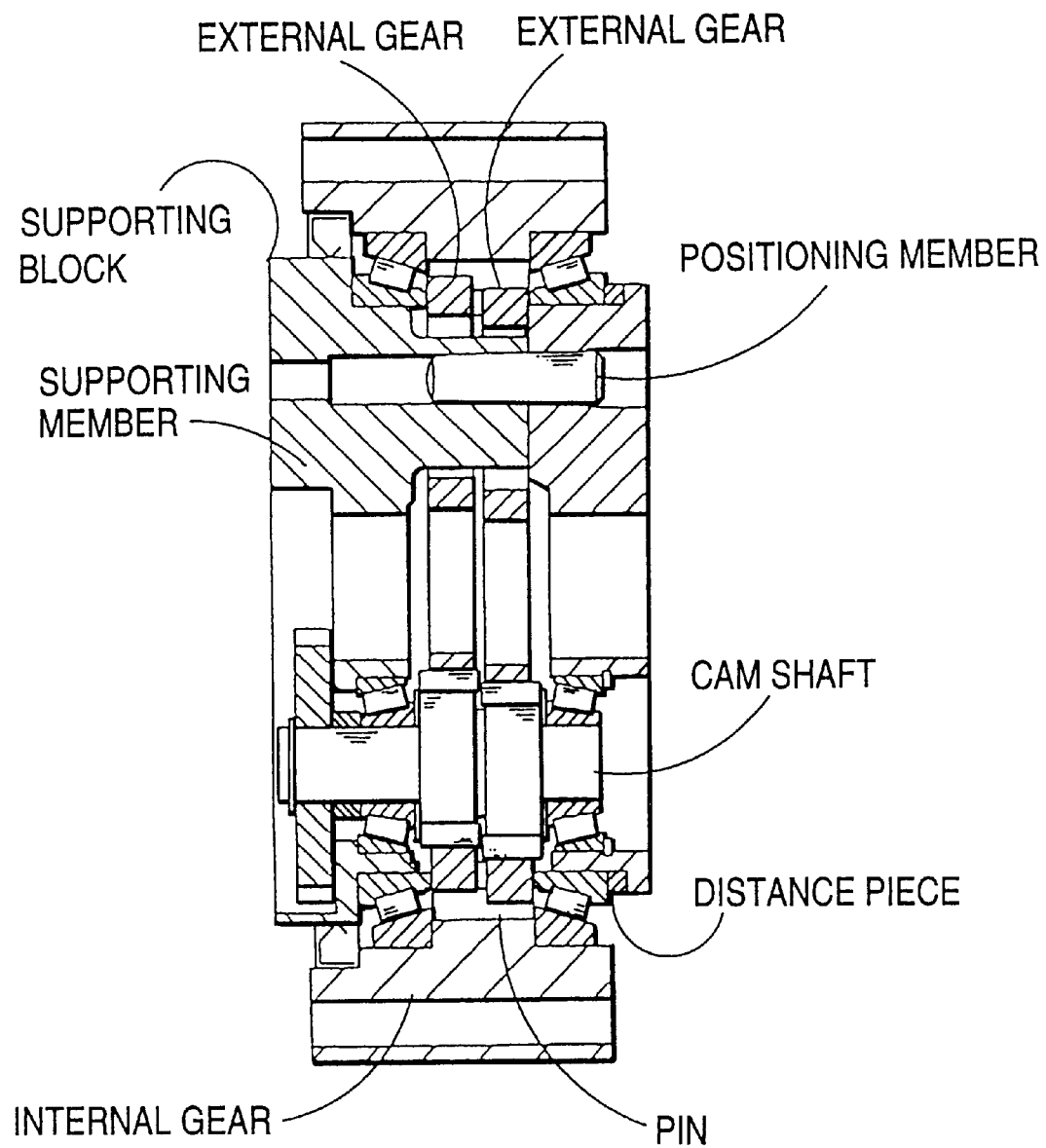
FIG. 16 is a sectional view of a conventional eccentric orbiting type planetary gear device.

Similarly, in the case of the internal gear, in order to strengthen its parts which are to be formed into rolling surface, the surface of the internal gear may be formed into a layer hardened by heat treatment, as shown in FIG. 14. Alternatively, as shown in FIG. 15, a different kind of member is welded to the part of the internal gear which is to have the rolling surfaces, so that it has a desired mechanical strength.

A specific feature of the eccentric orbiting type planetary gear device resides in that the bearing rolling surfaces are formed in the gear, not depending on the number of cam shafts, the number of external gears, and the difference in the number of teeth between the internal gear and the external gear.

The bearing rolling surfaces are formed in the supporting block at predetermined intervals; that is, the bearing rolling surfaces are integral with the supporting block. This makes it unnecessary to apply pre-load adjustment to the bearing, and reduces the number of components; that is, the assembling efficiency is improved greatly. In addition, the gap between the bearing inner race and the bearing insertion section is eliminated, so that the rigidity against bending moment is improved; that is, the device is able to withstand a great external force.

The internal gear includes the pin-shaped protrusions, and has the bearing rolling surfaces at predetermined intervals on both sides, which makes it unnecessary to give pre-load adjustment to the bearing and make it possible to reduce the number of components; that is, to assemble the device with higher assembling efficiency. In addition, in the device of the invention, the gaps between the internal gear and the pins, and the gap between the bearing inner race and the bearing insertion section is eliminated, so that the rigidity against bending moment is improved; that is, the device is able to withstand a great external force.

The bearing rolling surfaces are formed in the supporting block at predetermined intervals, and the internal gear includes the pin-shaped protrusions and has the bearing rolling surfaces at predetermined intervals on both sides. This feature makes it unnecessary to apply pre-load adjustment to the bearing, and greatly reduces the number of components; that is, the assembling efficiency is improved greatly when compared with the conventional device. In addition, in the device of the invention, the gaps between the internal gear and the pins, and the gap between the bearing inner race and the bearing insertion section is completely eliminated, so that the rigidity against bending moment is improved; that is, the device is able to withstand a great external force.

Furthermore, in the case where the angular ball bearing grooves are employed as the bearing rolling surfaces, the groove machining operation can be achieved with ease.

What is claimed is:

1. An eccentric orbiting planetary gear device comprising an internal gear, an external gear, a cam shaft, and a supporting block including a supporting member having a plurality of integrally formed pillar-like portions and a disk, said supporting member and said disk being positioned with respect to each other with a positioning member and fastened to each other with a fastening member such that the pillar-like portions directly contact the disk with said external gear set between said supporting member and said disk, the positioning member being located within the pillar-like portions and the disk, wherein, said supporting member has an integral first bearing rolling surface corresponding to an inner race, and said disk has an integral second bearing rolling surface corresponding to an inner race, said first and second bearing rolling surfaces being formed on said support block when said supporting member and said disk are fastened to each other, said first and second bearing rolling surfaces are located at a predetermined interval on said supporting block, and bearing rolling elements are mounted on said first and second bearing rolling surfaces.

2. An eccentric orbiting planetary gear device according to claim 1, wherein each of said bearing rolling surfaces is an angular ball bearing groove.

3. An eccentric orbiting planetary gear device according to claim 1, wherein said internal gear has integral pin-shaped portions located at predetermined angular intervals.

4. An eccentric orbiting planetary gear device comprising a single, one piece internal gear, an external gear, a cam shaft, and a supporting block including a supporting member in contact with a disk and having a plurality of pillar-like portions, said supporting member and said disk being positioned with respect to each other with a positioning member and fastened to each other with a fastening member with said external gear set between said supporting member and said disk, wherein, said internal gear is engaged with said external gear and includes an internal surface having bearing rolling surfaces thereon corresponding to outer races and located at a predetermined interval, and bearing rolling elements are mounted on said bearing rolling surfaces.

5. An eccentric orbiting planetary gear-device comprising an internal gear, an external gear, a cam shaft, and a supporting block including a supporting member having a plurality of integrally formed pillar-like portions and a disk, said supporting member and said disk being positioned with respect to each other with a positioning member and fastened to each other with a fastening member such that the pillar-like portions directly contact the disk with said external gear set between said supporting member and said disk, the positioning member being located within the pillar-like portions and the disk, wherein, said supporting member has an integral first bearing rolling surface corresponding to an inner race, and said disk has an integral second bearing rolling surface corresponding to an inner race, said first and second bearing rolling surfaces being formed on said support block when said supporting member and said disk are fastened to each other, said first and second bearing rolling surfaces are located at a first predetermined interval on said supporting block, said internal gear is engaged with said external gear and has integral third and fourth bearing rolling surfaces corresponding to outer races and located at a second predetermined interval, and bearing rolling elements are mounted between said first and third bearing rolling surfaces and between said second and fourth bearing rolling surfaces.

* * * * *